United States Patent [19]
Starks

[11] 3,818,043
[45] June 18, 1974

[54] CUPROUS CHLORIDE AS A CATALYST FOR THE REACTION OF AN ALDEHYDE WITH AN OLEFIN

[75] Inventor: Charles M. Starks, Ponca City, Okla.

[73] Assignee: Continental Oil Company, Ponca City, Okla.

[22] Filed: May 1, 1972

[21] Appl. No.: 249,113

Related U.S. Application Data

[63] Continuation-in-part of Ser. No. 877,465, Nov. 17, 1969, abandoned.

[52] U.S. Cl....... 260/340.7, 260/614 A, 260/635 H, 260/638 R
[51] Int. Cl............................................ C07d 15/04
[58] Field of Search............... 260/340.7, 340.5, 611

[56] References Cited
UNITED STATES PATENTS
2,490,276  12/1949  Munday et al................... 260/340.7

OTHER PUBLICATIONS
Sakai et al., "Chemical Abstracts," Vol. 68, 1968.

*Primary Examiner*—Donald G. Daus
*Assistant Examiner*—James H. Turnipseed
*Attorney, Agent, or Firm*—Ronald J. Carlson

[57] ABSTRACT

An olefin and an aldehyde may be reacted in the presence of an aqueous solution of a strong acid and cuprous chloride in a two-phase reaction system to produce unsaturated 1-alcohols and diols which are readily converted into compounds useful as detergents, polyesters and the like and dioxanes which may be used as solvents.

7 Claims, No Drawings

CUPROUS CHLORIDE AS A CATALYST FOR THE REACTION OF AN ALDEHYDE WITH AN OLEFIN

This is a continuation-in-part of U.S. Pat. application Ser. No. 877,465, filed Nov. 17, 1969 now abandoned.

This invention relates to the use of cuprous chloride as a catalyst for the reaction between an aldehyde and an olefin in the presence of a strong acid.

The reaction between an aldehyde and an olefin in the presence of a strong acid is well known in the art and has been referred to as the "Prins Reaction," "Advanced Organic Chemistry," Fieser and Fieser, 1961, pp 462–463. A representative example of this well-known reaction is as follows:

$$RCH=CH_2 + CH_2O \xrightarrow{H_2SO_4} RCH=CHCH_2OH,$$

$RCHOHCH_2CH_2OH$ and 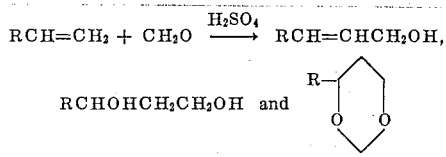

Sulfuric acid and other strong acids are required as catalysts for the reaction. Since these acids are generally available as aqueous solutions, problems are introduced with their use in conducting the reaction due to the insolubility of the olefins in water. In other words, a phase problem occurs wherein the olefin forms one phase and water forms the other phase. Since the acid and the aldehyde are soluble in the water phase at least some of the catalyst (acid) and one of the reactants (aldehyde) are effectively separated from the olefin thus adversely affecting the reaction. In the representative example outlined above, the usual procedure adopted is to add sufficient acetic acid to the mixture of olefin, formaldehyde and sulfuric acid until all of the components are in solution. Thus, the acetic acid acts to solubilize the reactants and acid catalyst and bring the materials together so that reaction may take place. While this procedure allows the reaction to proceed reasonably well, it is unsatisfactory in that a portion of the alcohols formed are esterified by the acetic acid. This requires that the product mixture be hydrolyzed to recover acetic acid and product alcohols.

In accordance with this invention, it was unexpectedly discovered that a two-phase mixture of an aldehyde, an olefin and an aqueous hydrochloric or sulfuric acid may be effectively reacted by the addition of cuprous chloride. Thus, the reaction between the aldehyde and olefin proceeds exceedingly well even though an organic phase and an aqueous phase are formed in the reaction mixture and are present during reaction. This means that the reaction can be run under mild conditions.

The two reactants involved in the reaction are aldehydes and olefins. The aldehydes may be defined by R'CHO wherein R' is hydrogen or an alkyl group having 1 to 10 carbon atoms but most preferably $C_1$–$C_4$ aliphatic aldehydes, e.g., formaldehyde or a compound such as trioxane or paraformaldehyde which decompose to formaldehyde under reaction conditions, butyraldehyde, acetaldehyde, propaldehyde, and the like. Mixtures of aldehydes may be employed.

The olefins suitable for use in the reaction may be defined by $R_2C=CH_2$ wherein each R is hydrogen or an alkyl group having 1 to 20 carbon atoms, at least one R being an alkyl group. However, the olefins are preferably straight chain $C_3$ to $C_{22}$ 1-olefins such as propylene, 1-hexene, 1-octene, 1-tetradecene, 1-dodecene, 1-heptadecene, 1-butylene, 1-hexadecene, and the like. Mixtures of olefins may be employed.

The reaction between the above-described olefins and aldehydes is conducted in the presence of an aqueous solution of a strong acid such as aqueous sulfuric acid or hydrochloric acid and cuprous chloride. The acids should be in aqueous solution to the extent of about 5 weight percent to about 65 weight percent to maintain two phases as described hereinafter and prevent charring of the reactants or products. Pressure will be necessary in the case of HCl above about 37 weight percent to maintain the HCl in solution as is well known in the art. It should be understood that the water and acid may be added separately to the reaction vessel. Moreover, the water, in part or in whole, may be added along with the formaldehyde in solution. In any event, when the materials have been charged to the reaction vessel, there are formed an organic phase and an aqueous phase since the olefins are insoluble in water. As the reaction proceeds the olefins and aldehydes react to form a product mixture which is predominantly made up of unsaturated 1-alcohols, diols and dioxanes and which is recognized in the art, see "Advanced Organic Chemistry," supra. This product mixture, for the most part, goes into the organic phase as it is formed and gradually replaces the olefins as they become reacted. The theory as to the mechanism by which the reaction takes place under these conditions has been referred to as phase transfer catalysis and has been described in JACS, 93, pp 195–199 (1971), see particularly footnote 12.

In general, the particular quantities of reactants, acids and cuprous chloride employed in the process may vary over wide ranges as they merely affect the rate of reaction and form no essential aspect of the invention. However, for purposes of illustration, the mol ratio of aldehyde to olefin may range from about 1/1 to 30/1, the acid may be employed in an amount of about 0.1 mol to about 50 mols per mol of aldehyde with the acid being in aqueous solution, and the cuprous chloride may be employed in an amount of about 0.01 mol to 1 mol per mol of acid with best results being obtained where the aqueous phase is saturated with cuprous chloride. The reaction is preferably conducted at temperatures in the range of about 25° to about 200° C. In addition, inert materials may be present such as benzene.

As mentioned previously, the reaction product derived from the above-described process predominantly includes unsaturated 1-alcohols, diols and dioxanes. These materials may be separated from the reaction product by conventional distillation techniques. The unsaturated 1-alcohols may then be hydrogenated to the corresponding saturated 1-alcohols followed by sulfonation or ethoxylation to form compounds useful as detergents as is well known in the art. The diols may be used in forming polyesters suitable for spinning into fibers or extrusion into films. The dioxanes may be used for solvents.

The following examples will serve to further illustrate the invention:

EXAMPLE 1

Reaction in Absence of Cuprous Chloride

A mixture of 25 g of 1-octene, 20 g of paraformaldehyde and 50 ml of 37 weight percent aqueous hydrochloric acid was heated with 5 g of benzene at 60° C for 3 hours. The benzene, an inert, was used as an internal gas-liquid phase chromatography (GLPC) standard in order to analyze and determine the extent of reaction in the samples described hereinafter. Benzene remained in the organic phase and had no effect of the two-phase system insofar as the reaction was concerned. Stirring was done with a paddle stirrer operating at a constant speed of 300 rpm. During the time of reaction, samples of the organic phase were removed every half hour and analyzed by gas chromatography to determine the extent of reaction based on olefin consumed. The analysis is shown in the table.

EXAMPLES 2-4

Example 1 was repeated several times except that an amount of cuprous chloride was included in the mixture during reaction as shown in the table. The resulting reaction product contained predominantly isomers of 2-nonene-1-ol; 1,3-nonanediol; and 4-hexyl-1,3-dioxacyclohexane. The analyses of extent of reaction are shown in the table. The isomers of 2-nonene-1-ol can be separated from the reaction product by conventional distillation, hydrogenated to the corresponding saturated nonane-1-ol and then ethoxylated according to standard techniques to form compounds useful as detergents. The 1,3-nonane-diol can be similarly separated and reacted with dicarboxylic acids to form high molecular weight polyesters useful in molding plastic articles.

EXAMPLE 5

Example 1 was again repeated except that 15 g of CoCl$_2$ was included in the mixture during reaction. The analysis is shown in the table.

TABLE

| Example | g CuCl | % Reaction after Time (± 3%) | | |
|---------|--------|--------|---------|---------|
|         |        | 1 Hour | 2 Hours | 3 Hours |
| 1       | 0.0    | 0.0    | 0.0     | 0.0     |
| 2       | 2.0    | 9.5    | 15.0    | 20.0    |
| 3       | 5.0    | 12.5   | 29.0    | —       |
| 4       | 15.0   | 17.8   | 33.7    | 54.2    |
| 5       | —      | 0.0    | 0.0     | 0.0     |

From the above data, it can be seen that no reaction occurred when only the acid catalyst was present or when the acid catalyst was present in combination with CoCl$_2$. On the other hand, significant reaction was obtained when the acid catalyst was present in combination with CuCl.

EXAMPLE 6

Similar results may be obtained when repeating the precedure described in Examples 2-4 substituting propylene for 1-octene in which case the reaction product would predominantly contain 2-butene-1-ol; 1,3-butane-diol; and 4-ethyl-1,3-dioxacyclohexane which may be separated by distillation and used as described hereinbefore.

EXAMPLE 7

Significant reaction may be obtained between formaldehyde and 1-dodecene, 1-tetradecene, 1-hexene and 1-heptadecene, respectively, in accordance with the invention as described. The respective reaction products will predominantly contain the unsaturated 1-ols, diols and dioxanes as previously indicated.

EXAMPLE 8

Butyraldehyde and 1-tetradecene may be reacted in accordance with the invention in the presence of aqueous sulfuric acid and cuprous chloride to produce the unsaturated 1-ols, diols and dioxanes as previously indicated.

EXAMPLE 9

Following the procedure set forth in Example 4, propaldehyde and acetaldehyde may be reacted with 1-dodecene in the presence of aqueous hydrochloric acid and cuprous chloride with similar results.

Thus, having described the invention in detail, it will be understood that certain variations and modifications may be made without departing from the spirit and scope of the invention as defined herein and in the appended claims.

I claim:

1. A process comprising the step of reacting an olefin defined by $R_2C=CH_2$ wherein each R is hydrogen or alkyl having 1 to 20 carbon atoms, at least one R being alkyl, with an aldehyde defined by R'CHO wherein R' is hydrogen or alkyl having 1 to 10 carbon atoms in the presence of an aqueous solution of sulfuric acid or hydrochloric acid and cuprous chloride in a two-phase reaction system.

2. A process according to claim 1 wherein the olefin is defined as straight chain $C_3$ to $C_{22}$ 1-olefins.

3. A process according to claim 2 wherein the olefin is a mixture of 1-olefins.

4. A process according to claim 2 wherein the aldehyde has from 1 to 4 carbon atoms.

5. A process according to claim 4 wherein the aldehyde is a mixture of aldehydes.

6. A process according to claim 1 wherein the acid is hydrochloric acid.

7. A process according to claim 1 wherein the acid is sulfuric acid.

* * * * *